US009100227B2

(12) United States Patent
Singh et al.

(10) Patent No.: US 9,100,227 B2
(45) Date of Patent: Aug. 4, 2015

(54) METHODS AND APPARATUS FOR ESTIMATING CHANNEL TIME AND FREQUENCY CORRELATIONS IN OFDM COMMUNICATION RECEIVER

(75) Inventors: Jaspreet Singh, Richardson, TX (US); Sudhir Ramakrishna, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 234 days.

(21) Appl. No.: 13/597,073

(22) Filed: Aug. 28, 2012

(65) Prior Publication Data
US 2013/0051489 A1    Feb. 28, 2013

Related U.S. Application Data

(60) Provisional application No. 61/529,122, filed on Aug. 30, 2011.

(51) Int. Cl.
*H04L 27/06*    (2006.01)
*H04L 25/02*    (2006.01)
*H03D 1/00*    (2006.01)
*H04L 27/26*    (2006.01)

(52) U.S. Cl.
CPC ........ *H04L 25/0212* (2013.01); *H04L 25/0222* (2013.01); *H04L 25/0224* (2013.01); *H04L 27/2647* (2013.01)

(58) Field of Classification Search
CPC ...... H04B 1/709; H04B 1/707; H04B 5/0007; H04L 27/2647; H04L 27/2657; H04L 1/0618; H04L 1/06; H04L 7/042; H04L 27/2662
USPC .................................. 375/260, 267, 316, 343
See application file for complete search history.

(56) References Cited

U.S. PATENT DOCUMENTS 7,139,320 B1 * 11/2006 Singh et al. .................... 375/260
8,837,621 B2 * 9/2014 Guey et al. .................... 375/267

\* cited by examiner

*Primary Examiner* — Ted Wang (57) ABSTRACT

Channel time and frequency correlations are determined from OFDM symbols and subframes using appropriately scaled sums of the products of the received pilot symbols at predetermined intervals n in time and/or frequency of resource elements within the resource blocks of the subframes. The correlation estimates may optionally be improved using pilot symbols for a plurality of antennas and for a plurality of pilot signal ports, and across a plurality of subframes. The calculated channel time and frequency correlations may be employed to improve estimates of channel characteristics for purposes such as selection of a transmission mode between a base station and a user equipment on the channel or for the purpose of channel equalization and data demodulation.

16 Claims, 6 Drawing Sheets

METHODS AND APPARATUS FOR ESTIMATING CHANNEL TIME AND FREQUENCY CORRELATIONS IN OFDM COMMUNICATION RECEIVER

CROSS-REFERENCE TO RELATED APPLICATION(S) AND CLAIM OF PRIORITY

This application claims priority to U.S. Provisional Patent Application Ser. No. 61/529,122, filed Aug. 30, 2011, entitled "METHODS AND APPARATUS FOR ESTIMATING CHANNEL TIME AND FREQUENCY CORRELATIONS IN OFDM COMMUNICATION RECEIVER." The above-identified patent document is hereby incorporated by reference.

TECHNICAL FIELD

The present disclosure relates generally to wireless communication channel characterization and, more specifically, to estimating channel time and frequency correlations.

BACKGROUND

Channel estimation is a key ingredient of any communication system. In practice, channel estimation algorithms are designed to exploit the channel time and/or frequency correlations, or, in other words, the statistics of the channel. To exploit these correlations, typically, the channel's power delay profile (PDP) and the Doppler frequency shift needs to be estimated. Such estimates are known to be hard problems, and often only very crude assumptions are made regarding related unknowns while performing channel estimation. For instance, the PDP may be assumed to have a uniform distribution, while the Doppler frequency may only be characterized by two levels (e.g., either high or low). While such simple approximations are attractive from a complexity perspective, the result may be highly sub-optimal performance.

There is, therefore, a need in the art for improved estimation of channel time and frequency correlations.

SUMMARY

Channel time and frequency correlations are determined from OFDM symbols and subframes using appropriately scaled sums of the products of the received pilot symbols at predetermined intervals n in time and/or frequency of resource elements within the resource blocks of the subframes. The correlation estimates may optionally be improved using pilot symbols for a plurality of antennas and for a plurality of pilot signal ports, and across a plurality of subframes. The calculated channel time and frequency correlations may be employed to improve estimates of channel characteristics for purposes such as selection of a transmission mode between a base station and a user equipment on the channel or for the purpose of channel equalization and data demodulation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Pilot (or "reference") symbols may be transmitted to assist a communication receiver perform accurate channel estimation. In an Orthogonal Frequency Division Multiplexing (OFDM) communication system, such as suggested for $3^{rd}$ Generation Partnership Project (3GPP) Long Term Evolution (LTE) and/or LTE-Advanced (LTE-A) networks in 3GPP TS 36.211 V10.1.0 (2011-03), "Evolved Universal Terrestrial Radio Access (E-UTRA); Physical channels and modulation" (the content of which is incorporated herein by reference), pilot symbols are inserted at different time-frequency locations, also referred to as Resource Elements (REs) in a Physical Resource Block (PRB).

Figure 1:
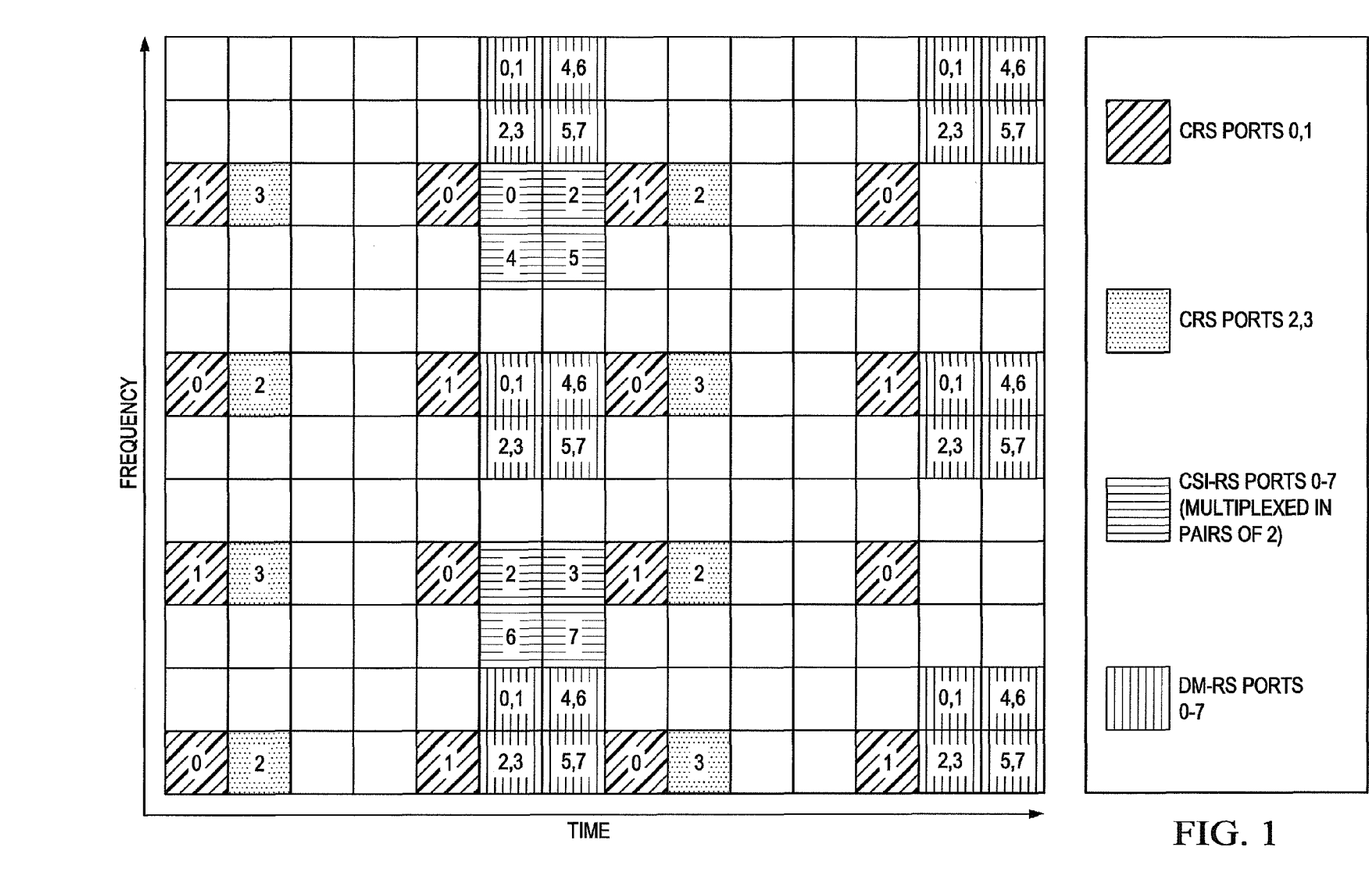
FIG. 1 illustrates an exemplary distribution of different types of pilot symbols that may be employed in a wireless communication system.

FIG. 1 illustrates different types of pilot signals that may be transmitted in the downlink of a wireless communications network, showing the locations and density of the following pilot signals: Common Reference Signals (CRSs) may be utilized for the twin purposes of data demodulation and channel state information (CSI) feedback; Channel State Information Reference Signals (CSI-RSs) may be employed to estimate and feedback accurate channel state information to the transmitter; and Demodulation Reference Signals (DM-RSs) may be utilized for channel estimation and equalization for data demodulation.

Pilot-assisted channel estimation in an OFDM wireless communication system may require interpolation across time and/or frequency. The channel at the pilot locations (REs) is first estimated based on the received samples, and the channel at all REs (possibly including pilot REs as well) is subsequently obtained by interpolation across time, frequency or both. Such interpolation based channel estimation procedures may be either one-dimensional (1D) or two-dimensional (2D), depending on whether the interpolation is performed across both time and frequency, or only across one of the two.

Channel estimation may utilize minimum mean square error (MMSE) computations, performing channel interpolation so as to minimize the mean square error (MSE) criterion. To perform MMSE channel estimation, knowledge of the prior statistics of the channel—namely, the PDP and the Doppler frequency—is required. The PDP specifies the multipath characteristics of the channel, while the Doppler frequency characterizes the relative motion between the transmitter and the receiver. Knowledge of the PDP and the Doppler frequency provides information on the channel frequency and time correlations, respectively, and these are exploited by the MMSE filter so as to minimize the MSE.

A pilot symbol assisted approach for estimating time frequency correlations in an OFDM system is described in the present disclosure, to facilitate improved channel estimation performance.

Figure 2:
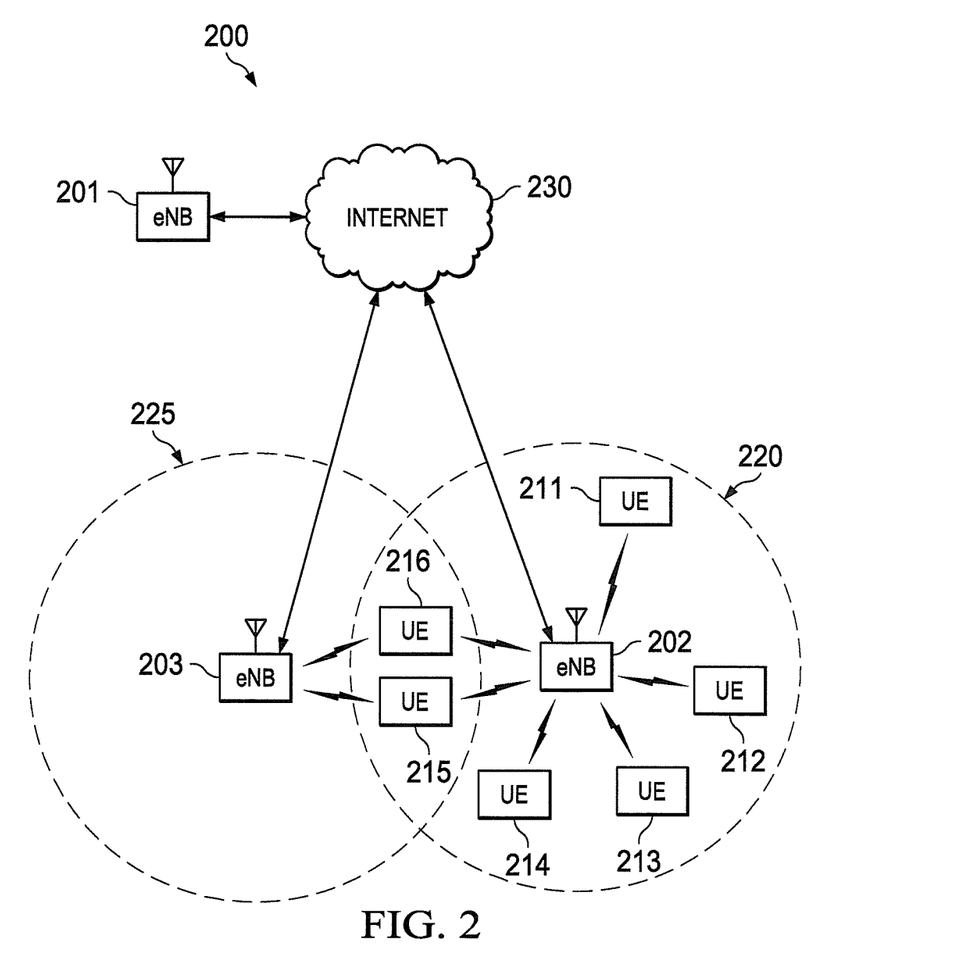
FIG. 2 is a block diagram of a wireless communication network according to embodiments of the present disclosure.

FIG. 2 is a high level diagram illustrating an exemplary wireless network implementing estimation of channel time and frequency correlations according to one or more embodiments of the present disclosure. The wireless network 200 illustrated in FIG. 2 is provided solely for purposes of explaining the subject matter of the present disclosure, and is not intended to suggest any limitation regarding the applicability of that subject matter. Other wireless networks may employ the subject matter depicted in the drawings and described herein without departing from the scope of the present disclosure. In addition, those skilled in the art will recognize that the complete structure and operation of a wireless network and the components thereof are depicted in the drawings and described therein. Instead, for simplicity and clarity, only so much of the structure and operation of the wireless network and the components thereof as are unique to the present disclosure or necessary for an understanding of the present disclosure are depicted and described.

In the illustrated embodiment, wireless network 200 includes an Evolved Node B ("eNodeB" or "eNB") 201, eNB 202, and eNB 203. Depending on the network type, other well-known terms may be used instead of "eNB," such as "base station" or "access point." For simplicity and clarity, the term "eNB" will be used herein to refer to the network infrastructure components that provide wireless access to remote (mobile or fixed) terminals.

The eNB 201 communicates with eNB 202 and eNB 203 via network 230 operating according to a standardized protocol (e.g., X2 protocol), via a proprietary protocol, or preferably via Internet protocol (IP). IP network 230 may include any IP-based network or a combination thereof, such as the Internet, a proprietary IP network, or another data network.

The eNB 202 provides wireless broadband access to a first plurality of user equipments (UEs) within coverage area 220 of eNB 202. The first plurality of UEs includes UE 211, which may be located in a small business; UE 212, which may be located in an enterprise; UE 213, which may be located in a wireless fidelity (WiFi) hotspot; UE 214, which may be located in a first residence; UE 215, which may be located in a second residence; and UE 216, which may be a mobile device, such as a cell phone, a wireless laptop, a wireless-enabled tablet, or the like. For simplicity and clarity, the term "user equipment" or "UE" is used herein to designate any remote wireless equipment that wirelessly accesses an eNB, whether the UE is a mobile device (e.g., cell phone, wireless-enabled tablet or laptop, etc.) or is normally considered a stationary device (e.g., desktop personal computer, wireless television receiver, etc.). In other systems, other well-known terms may be used instead of "user equipment," such as "mobile station (MS)," "subscriber station (SS)," "remote terminal (RT)," "wireless terminal (WT)," and the like.

The eNB 203 provides wireless broadband access to a second plurality of UEs within coverage area 225 of eNB 203. The second plurality of UEs includes UE 215 and UE 216. In an exemplary embodiment, eNBs 201-203 may communicate with each other and with UE 211-216 using Long Term Evolution (LTE) or LTE-A wireless communication techniques. While only six UEs are depicted in FIG. 2, it will be understood that wireless network 200 may provide wireless broadband access to additional UEs. It should be noted that UE 215 and UE 216 are located on the edges of both coverage area 220 and coverage area 225. UE 215 and UE 216 each communicate with both eNB 202 and eNB 203 and may be said to be operating in handoff mode, as known to those of skill in the art.

Figure 3:
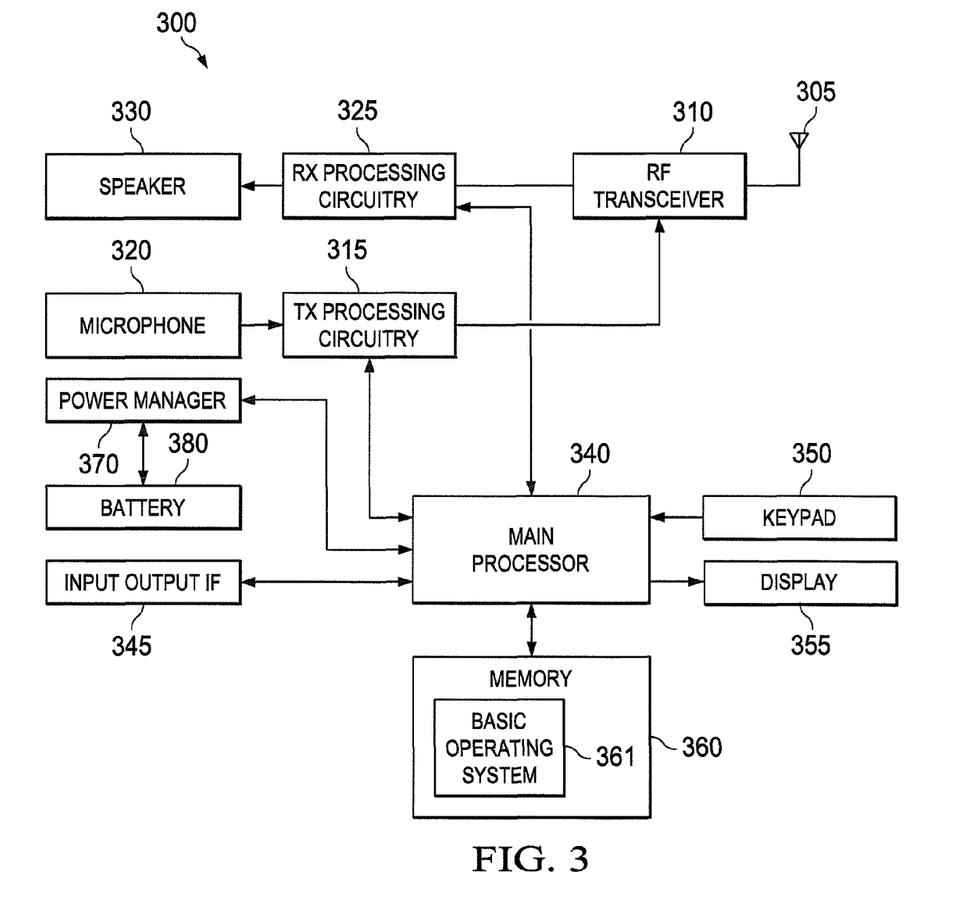
FIG. 3 illustrates user equipment employing estimation of channel time and frequency correlations according to one or more embodiments of the present disclosure.

FIG. 3 illustrates user equipment employing estimation of channel time and frequency correlations according to one or more embodiments of the present disclosure. UE 300 may represent any of the UEs 211-216 shown in FIG. 2. The particular structure of UE 300 illustrated in FIG. 3 is for illustration purposes only; other embodiments of UE 300 may be used to implement the subject matter of the present disclosure without departing from the scope of the disclosure. In addition, the eNBs 201, 202 and 203 will include much of the same structure depicted in FIG. 3, including the antenna(s), transceivers, transmit and receive processing circuitry, processor and memory.

In the exemplary embodiment of FIG. 3, UE 300 comprises antenna 305, radio frequency (RF) transceiver 310, transmit (TX) processing circuitry 315, microphone 320, and receive (RX) processing circuitry 325. UE 300 also comprises speaker 330, main processor 340, input/output (I/O) interface (IF) 345, keypad 350, display 355, memory 360, power manager 370, and battery 380.

Radio frequency (RF) transceiver 310 receives from antenna 305 an incoming RF signal transmitted by an eNB 201, 202 or 203 of wireless network 200 in FIG. 2. The received signal includes pilot signals described in further detail below, and UE 300 either performs channel time and/or frequency correlations estimation based on the pilot signals as described below or transmits received signal measurements to the eNB 201, 202 or 203 for such channel estimation based on the pilot signals. Alternatively, UE 300 transmits pilot signals to an eNB 201, 202 or 203, which receives the pilot signals and performs channel time and/or frequency correlations estimation based on the pilot signals as described below.

Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver processing circuitry 325 transmits the processed baseband signal to speaker 330

(i.e., voice data) or to main processor 340 for further processing (e.g., to execute functions in connection with web browsing).

Transmitter (TX) processing circuitry 315 receives analog or digital voice data from microphone 320 or other outgoing baseband data (e.g., web data, e-mail, interactive video game data) from main processor 340. Transmitter processing circuitry 315 encodes, multiplexes, and/or digitizes the outgoing baseband data to produce a processed baseband or IF signal. Radio frequency (RF) transceiver 310 receives the outgoing processed baseband or IF signal from transmitter processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. Memory 360 can be any computer readable medium. For example, memory 360 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. According to such embodiments, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of mobile station 300. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to power manager 370, which is further coupled to battery 380. Main processor 340 and/or 370 power manager may include software, hardware, and/or firmware capable of controlling and reducing power usage and extending the time between charges of battery 380. In certain embodiments, power manager 370 may be separate from main processor 340. In other embodiments, power manager 370 may be integrated in, or otherwise a part of, main processor 340. Power manager 370 is connected to and controls other components within UE 300, beyond the connections depicted in FIG. 3.

Main processor 340 is also coupled to keypad 350 and display unit 355. The operator of UE 300 uses keypad 350 to enter data into UE 300. Display 355 may be a liquid crystal or light emitting diode (LED) display capable of rendering text and/or graphics from web sites. Alternate embodiments may use other types of displays.

Figure 4A:
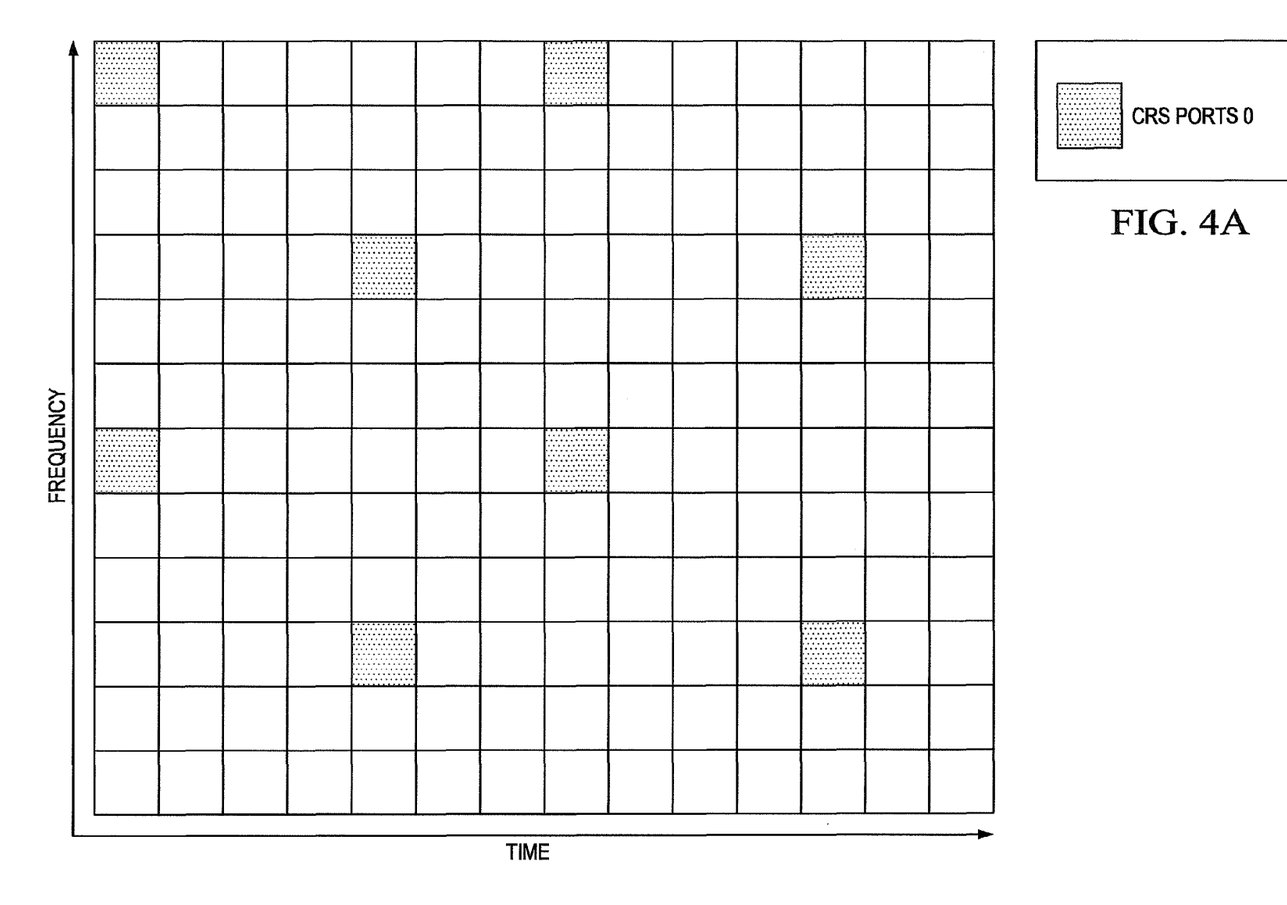
FIGS. 4A and 4B are diagrams of pilot symbol locations selected for estimation of channel time and frequency correlations according to one embodiment of the present disclosure.
Figure 4B:
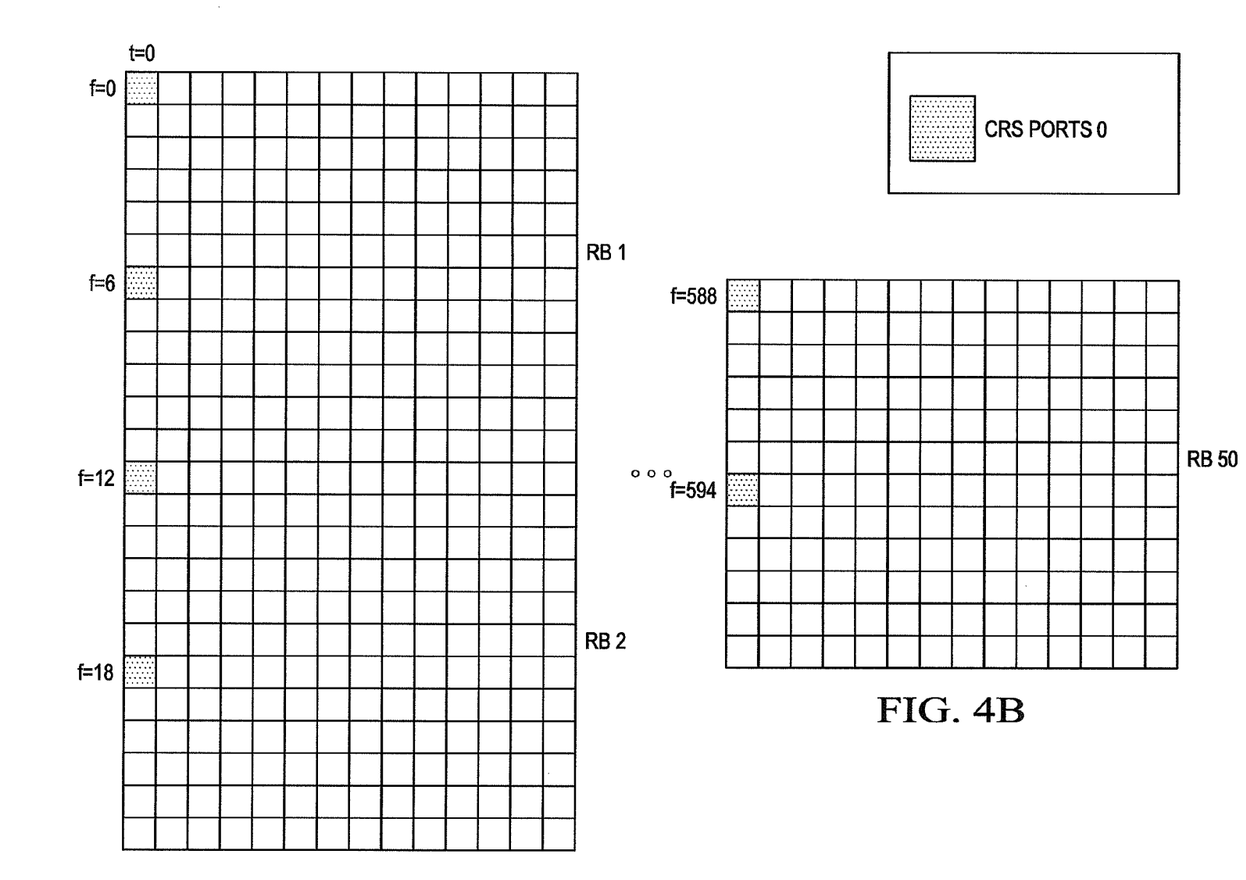

FIGS. 4A and 4B are diagrams of pilot symbol locations selected for estimation of channel time and frequency correlations according to one embodiment of the present disclosure. The location of CRS port 0 (where an antenna port specifies a pattern of pilot symbols on the time-frequency grid that is transmitted from a particular antenna) in a subframe is illustrated in FIG. 4A (for ease of illustration, a system with only one physical resource block, i.e., 12 frequency subcarriers, is shown), while the first OFDM symbol of CRS port 0 in a subframe with system bandwidth of fifty physical resource blocks (i.e., 600 frequency subcarriers) is illustrated in FIG. 4B. The estimation of channel time and frequency correlations is performed by either UE 300 or by one of eNBs 201, 202 and 203 based on channel measurements taken by UE 300 or by one of the eNBs. While the approach described in the present disclosure has general and generic application, the downlink of the 3GPP LTE-A standard and the use of the Common Reference Signals (CRSS) to estimate the time and frequency correlations are considered to illustrate the approach.

A frequency-time location on an OFDM grid is denoted by the pair (f,t), also referred to as the resource element (f,t), and the channel coefficient at this location is denoted by H(f,t). To perform two dimensional (2D) MMSE channel estimation, the following correlations are required: $E[H(f_1,t_1)H^*(f_2,t_2)]$, where the notation $H^*(f_2,t_2)$ denotes the complex conjugate of $H(f_2,t_2)$. It is known that:

$$E[H(f_1,t_1)H^*(f_2,t_2)]=\Phi(f_1-f_2)J_0(2\pi f_d(t_1-t_2)\Delta t) \quad (1)$$

where $\Phi(k)$ is the fast Fourier transform (FFT) of the power delay profile evaluated at frequency index k, $J_0$ is the zeroth order Bessel function, $f_d$ is the Doppler shift, and $\Delta t$ is the duration of an OFDM symbol. As evident, the only way the PDP and the Doppler frequency are being used by the MMSE estimator is through the computation of the channel correlations. Recognizing this, a method to directly compute these correlations is described in the present disclosure, bypassing the difficult task of estimating the PDP and the Doppler frequency. In the remainder of this disclosure, attention is restricted to computation of the frequency correlations. However, computation of the time correlations follows in a similar manner.

To apply the MMSE filter across frequencies, the frequency correlations $E[H(f_1)H^*(f_2)]=\Phi(f_1-f_2)$ are needed, and are computed empirically using the CRS. Specifically, for each CRS port, the CRS REs at a particular time instant are separated in frequency by 6 units. (FIG. 4A depicts the REs for CRS port 0). Thus, looking across the entire frequency bandwidth, the CRS REs within the same OFDM symbol are separated by multiples of 6 sub-carriers (i.e., separated by 6, or 12, or 18, and so on). By appropriately correlating the received data across the CRS REs, empirical estimates are obtained of $\Phi(k)$ for frequency lags k=6, 12, 18, ... (note $\Phi(-k)=\Phi^*(k)$).

To illustrate the concept, consider use of the first OFDM symbol of CRS port 0, and one particular receive antenna. (FIG. 4B depicts the first OFDM symbol in CRS port 0, for a 50 RB system). Denote by r(f,t) the received symbol (after descrambling, i.e., after multiplying the received symbols with the scrambling code used by the base station) at CRS RE location (f, t). To obtain empirical estimates, compute the following sums of products:

$$S(6)=r(6,0)\cdot r^*(0,0)+r(12,0)\cdot r^*(6,0)+\ldots r(594,0)\cdot r^*(588,0)$$

$$S(12)=r(12,0)\cdot r^*(0,0)+r(18,0)\cdot r^*(6,0)+\ldots r(594,0)\cdot r^*(582,0)$$

$$S(18)=r(18,0)\cdot r^*(0,0)+r(24,0)\cdot r^*(6,0)+\ldots r(594,0)\cdot r^*(576,0)$$

In general, for 1, 2, 3, ..., 99:

$$S(6m)=r(6m,0)\cdot r^*(0,0)+r(6(m+1),0)\cdot r^*(6,0)+\ldots r(594,0)\cdot r^*(594-6m,0),$$

where the index "6 m" denotes 6 multiplied by m. Denoting N(6), N(12), N(18), ..., N(6·m) the numbers of terms in each of the above sums, the required empirical estimates are given by the following averages $$\hat{\Phi}(6) = \frac{S(6)}{N(6)}, \hat{\Phi}(12) = \frac{S(12)}{N(12)}, \hat{\Phi}(18) = \frac{S(18)}{N(18)}, \hat{\Phi}(6 \cdot m) = \frac{S(6 \cdot m)}{N(6 \cdot m)}$$

where the notation $\hat{\Phi}(k)$ is used to denote an estimate of $\Phi(k)$. To improve the estimates, similar computations are performed across other symbols in CRS port 0, across other CRS ports, and finally across other receive antennas. Indexing the above summations, the notation $S_{k,p,s}(6m)$ is employed to denote the sums computed across symbol number s of CRS port p at receive antenna k. The following sums are computed:

$$\tilde{S}(6 \cdot m) = \sum_{k=1}^{N_{RX}} \sum_{p=0}^{N_P-1} \sum_{s=1}^{N_s(p)} \left[ \frac{S_{k,p,s}(6m)}{N(6m)} \right], m = 1, 2, 3, \ldots$$

where $N_{RX}$, $N_P$ denote the number of receive antennas and the number of CRS ports, respectively, while $N_s(p)$ denotes the number of OFDM symbols that contain CRS REs for CRS port p (note that $N_s(0)=N_s(1)=4$ and $N_s(2)=N_s(3)=2$ for the exemplary LTE-A-based system considered in this embodiment). The mean values of the summations then provide the desired empirical estimates. Denoting $N=N_{RX} \cdot \Sigma_{p=0}^{N_P-1} N_s(p)$, we compute $$\hat{\Phi}(6m) = \frac{\tilde{S}(6m)}{N}, m = 1, 2, 3, \ldots$$

The preceding analysis is based on the CRS received within one particular subframe. Since CRS is present in every subframe, and since the PDP (and hence the frequency correlation) is not expected to vary over a period of several subframes, the estimates are further improved by averaging across subframes. Note that this does not explicitly require storage of any of the previous subframes CRS samples (although that may be done, as well). Rather, an accumulated sum is simply stored and updated every subframe. Denoting the number of subframes received by I, the sum $$S_I(6m) = \sum_{i=1}^{I} \frac{\tilde{S}_i(6m)}{N}$$

is stored, with the update $$S_{I+1}(6m) = S_I(6m) + \frac{\tilde{S}_{i+1}(6m)}{N}$$

Such that the empirical estimates after receiving I subframes are $$\hat{\Phi}_I(6m) = \frac{S_I(6m)}{I}, m = 1, 2, 3, \ldots$$

The preceding embodiments illustrate computation of the empirical correlations by summing (and averaging) across different CRS symbols, different CRS ports, different antennas, and different subframes. In another embodiment, this summing and averaging may be performed only across of a subset of the all the CRS symbols, or a subset of all the CRS ports, a subset of all the antennas, or a subset of all the subframes (up to and including the current subframe).

In another embodiment of the present disclosure, the summing and averaging across CRS symbols, or CRS ports, or antennas, or subframes may be performed in a weighted manner, with potentially unequal weights assigned to different CRS symbols, CRS ports, antennas or subframes. The weights may be used to specify the importance of the respective quantities. For instance, the current subframe may be given more importance than the preceding subframe, so that when performing the averaging across subframes, more importance is given to the current subframe.

After obtaining the estimates at lags that are multiples of six by direct computation, the correlations at intermediate lags are obtained by simple linear interpolation.

In another embodiment, the correlations at the intermediate lags are obtained by methods other than linear interpolation. For instance, quadratic interpolation may be used. As another example, FFT based interpolation may be used.

In the preceding embodiments, we illustrate the computation of the channel frequency correlations. Computation of the channel time correlations can be performed using similar methods. As an example, an estimate of the term $J_0(2\pi f_d l \Delta t)$ could be obtained by carrying out summing and averaging of the products formed by taking pilot RE pairs where the REs are separated in time by l OFDM symbols. Furthermore, joint estimates of the time and frequency correlations, i.e., joint estimates of $\Phi(k)J_0(2\pi f_d l \Delta t)$, can be obtained by carrying out the summing and averaging of the products formed by taking pilot RE pairs where the REs are separated in frequency and time by k sub-carriers and l OFDM symbols, respectively.

At any CRS location, the received symbol is corrupted by thermal noise as well as other cell interference. However, while estimating the channel correlations as described above, the cross terms arising due to such factors go to zero (on the average) due to independence of the noise and the interference across different REs.

The preceding embodiments illustrate the approach for estimating the correlations at non zero values of the frequency lags. The correlation at lag 0, focusing, for simplicity, on frequency correlations again, is $\Phi(0)=|H(f)|^2$. This is a function of the channel signal to noise ratio (SNR), and hence can be obtained based on the SNR knowledge. Alternatively, it is computed using the CRS samples as well. Specifically, as for other frequency lag values, the sum of products $$S(0)=r(0,0) \cdot r^*(0,0)+r(6,0) \cdot r^*(6,0)+ \ldots r(594,0) \cdot r^* (594,0),$$

is computed and the average is taken to obtain an estimate of the correlation at lag 0. Note, however, that in case of lag 0, the cross terms due to noise do not vanish. Rather each term in this sum contributes the noise variance $\sigma^2$ as well, so that the estimate becomes $$\hat{\phi}(0) = \frac{S(0)}{N(0)} - \sigma^2$$

where N(0) denotes the number of terms in this summation. As before, the estimate can be improved by performing the averaging over more ports, or more antennas, or more subframes.

In the preceding embodiments, it is assumed that the power of the transmitted pilot symbols is unity. If the power of pilot symbols is not unity, the estimates of the correlation derived in the preceding embodiments are adjusted by dividing by the power of the pilot symbols. Similarly, if the scrambling (at transmitter) and descrambling (at receiver) operations result in a power gain (or power loss), the estimates of the correlation derived in the preceding embodiments are adjusted by dividing by this power gain (or power loss).

In another embodiment, the correlation estimates disclosed in the previous embodiments may not be used as-is by the receiver. Rather, the receiver may use some function of these estimates to arrive at a modified estimate of the correlations.

Figure 5:
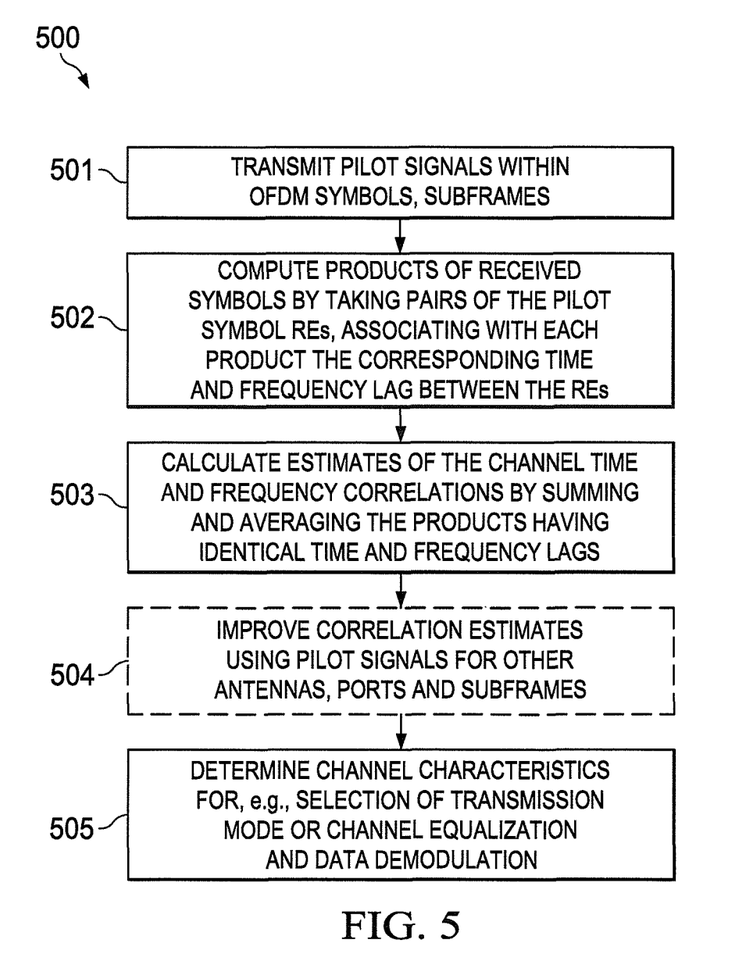
FIG. 5 is a high level flow diagram illustrating a process of estimating channel correlations for time, frequency or both according to one embodiment of the present disclosure.

FIG. 5 is a high level flow diagram illustrating a process of estimating channel correlations for time, frequency or both according to one embodiment of the present disclosure. The sequential steps depicted in FIG. 5 are not intended to imply exclusion of intervening or intermediate steps, and unless explicitly stated otherwise one or more steps may be executed concurrently or in an overlapping fashion with other steps or in a different order relative to other steps than depicted. The process 500 is executed within one of a UE and an eNB, based on pilot signals transmitted in the manner described above by one of a UE and an eNB. For example, an eNB may transmit the pilot signals in the manner described above, a UE may obtain channel measurements based on the transmitted pilot signals, and then estimate channel correlations for time, frequency or both based on the received channel measurements. In general, some portions of the process 500 may be performed in a distributed or collaborative fashion within more than one device within a wireless communications network.

The process 500 begins with transmission of pilot signals (CRS, CSI-RS, and/or DM-RS) at RE locations spaced at certain (possibly predefined) intervals of time and frequency within OFDM symbols and the subframes containing such symbols (step 501). In the example discussed above, CRS pilot signals at frequency (only) interval n=6 were considered for purposes of explanation, although the principles described are applicable to other pilot signals, other frequency intervals, time intervals (alone), and intervals in both time and frequency.

Aggregates of the products of the received symbols r(f,t) at pilot RE locations spaced with the selected frequency and/or time interval are then calculated (step 502), and used with the number of symbols aggregated to determine empirical estimates of the channel time and/or frequency correlations (step 503). The correlation estimates may be based on computations across a plurality of reference symbols, references symbol ports, antennas, and subframes (step 504), as described above. Finally, the correlation estimates are used to determine channel characteristics and adjust transmissions (e.g., selection of a transmission mode such as a particular pre-coding matrix or the like) to at least improve if not optimize communications over the channel (step 505), or alternatively to perform channel equalization and data demodulations.

Notably, the correlation estimates computed using the above described embodiments may be used for other purposes in a communication system, and not just for the purpose of channel estimation.

In another embodiment, the disclosed methods may also be used for estimating the channel correlation in the space dimension (in addition to the time and frequency dimensions). In other words, the methods can be used to estimate the spatial correlations (correlations in the channels between different transmit antenna-receive antenna pairs) of the channel.

Channel estimation is an essential component of mobile broadband wireless communications such as LTE-A, such that estimation of time/frequency correlations presents a very important problem. Design and optimal operation of high-speed reliable communications components hinges on knowledge of channel time/frequency correlations. Using already existing pilot data, the present disclosure provides a new technique for estimating channel time/frequency correlations.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
receiving at least one antenna a transmission including a plurality of pilot symbols;
calculating estimate of channel correlations of at least one of time and frequency based on pilot symbols at a predetermined interval of resource elements (REs) in at least one of time and frequency within the received transmission; and
based on the estimate of the channel correlations, determining channel characteristics for one of selection of a transmission mode and performing channel equalization and data demodulation.

2. The method according to claim 1, further comprising:
calculating estimates of channel correlations of both time and frequency.

3. The method according to claim 1, further comprising:
calculating the estimates of channel correlations across a plurality of antenna ports.

4. The method according to claim 1, further comprising:
calculating the estimates of channel correlations based on pilot symbols received at a plurality of ports of the at least one antenna.

5. The method according to claim 1, further comprising:
calculating the estimates of channel correlations based on pilot symbols received at a plurality of antennas.

6. The method according to claim 1, further comprising:
calculating the estimates of channel correlations across a plurality of subframes within the received transmission.

7. The method according to claim 1, further comprising:
calculating products $r(f_1, t_1) \cdot r^*(f_2, t_2)$, where $r(f,t)$ is the received symbol at RE $(f,t)$ within a received subframe, and the products are computed taking pairs of REs that are used for transmission of pilot symbols.

8. The method according to claim 7, further comprising:
categorizing the products based on a frequency lag (f1-f2) and a time lag (t1-t2), and summing and averaging all products that have identical values of frequency and time lags to obtain the estimates of channel frequency and time correlations at those frequency and time lags.

9. The method according to claim 8, further comprising:
enhancing the estimates of the correlations by considering the pilot symbols across different reference symbol ports, different receive antennas, or different subframes.

10. The method according to claim 8, further comprising:
obtaining the estimates of the channel time and frequency correlations at other values of the time and frequency lags by interpolating the already estimated correlations using one of linear interpolation, quadratic interpolation, Fast Fourier Transform (FFT) interpolation, or another interpolation.

11. A receiver, comprising:
   at least one antenna receiving symbol measurements for a plurality of pilot symbols received in a transmission including the plurality of pilot symbols at least one port of at least one antenna;
   a processor configured to calculate an estimate of channel correlations of at least one of time and frequency based on pilot symbols at a predetermined interval of resource elements (REs) in at least one of time and frequency within the received transmission, and to determine, based on the estimate of the channel correlations, channel characteristics for one of selection of a transmission mode and performing channel equalization and data demodulation.

12. The receiver according to claim 11, wherein the processor is configured to calculate estimates of channel correlations of both time and frequency based on pilot symbols received at a plurality of ports of the at least one antenna, across a plurality of antennas and across a plurality of subframes.

13. The receiver according to claim 11, wherein the processor is configured to calculate products $r(f_1, t_1) \cdot r^*(f_2, t_2)$, where $r(f,t)$ is the received symbol at RE $(f,t)$ within a received subframe, and the products are computed taking pairs of REs that are used for transmission of pilot symbols.

14. The receiver according to claim 11, wherein the processor is configured to categorize the products based on a frequency lag (f1-f2) and a time lag (t1-t2), and summing and averaging all products that have identical values of frequency and time lags to obtain the estimates of channel frequency and time correlations at those frequency and time lags.

15. The receiver according to claim 14, wherein the processor is configured to enhance the estimates of the correlations by considering pilot symbols across different reference symbol ports, different receive antennas, or different subframes.

16. The receiver according to claim 14, wherein the processor is configured to obtain the estimates of the channel time and frequency correlations at other values of the time and frequency lags by interpolating the already estimated correlations using one of linear interpolation, quadratic interpolation, Fast Fourier Transform (FFT) interpolation, or another interpolation.

* * * * *